J. G. CALLAN.
COMBINED EMERGENCY AND THROTTLE VALVE.
APPLICATION FILED APR. 16, 1909.
1,017,619.
Patented Feb. 13, 1912.
3 SHEETS—SHEET 1.
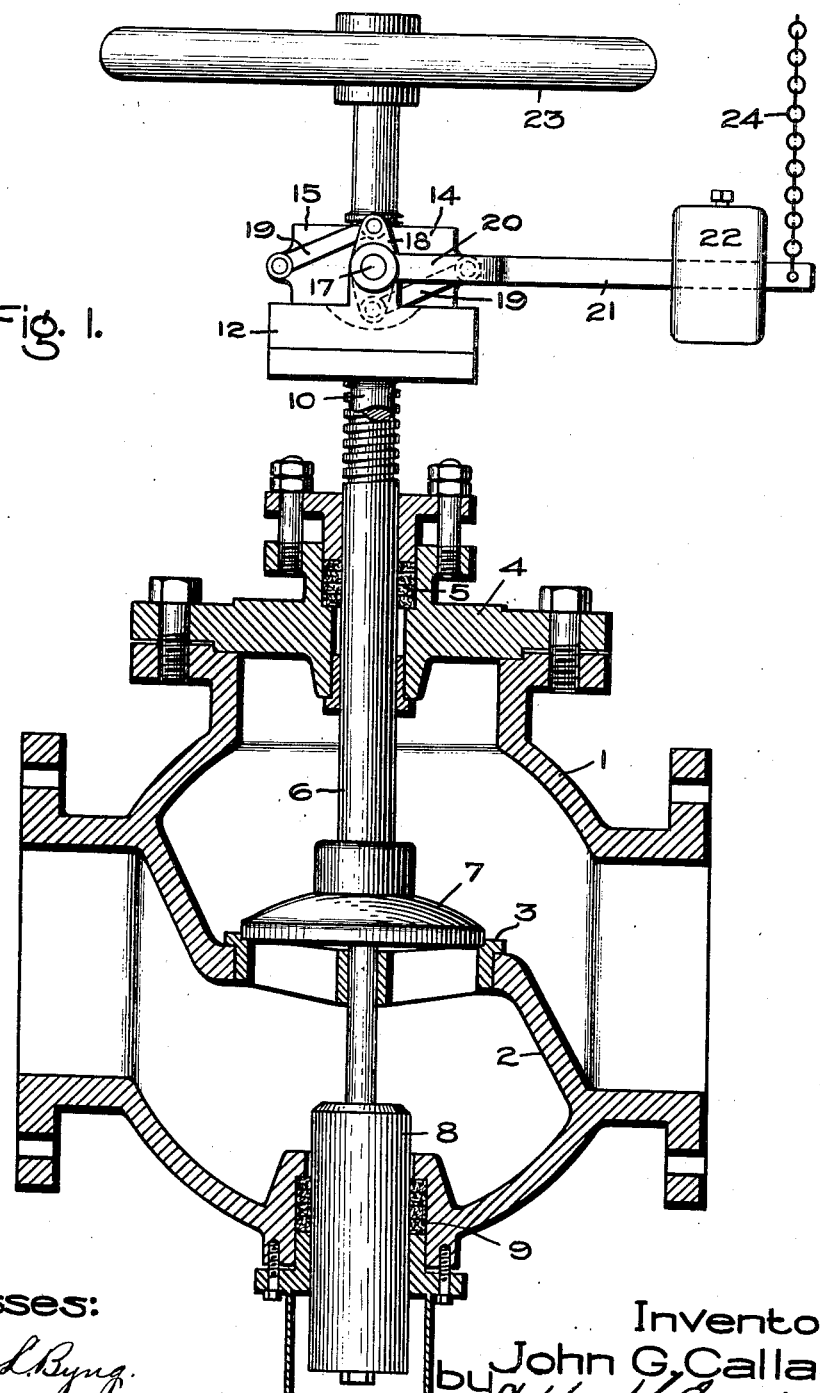
Fig. I.
Witnesses:
Marcus L. Byng.
J. Ellis Glen
Inventor,
John G. Callan,
by
Att'y.

J. G. CALLAN.
COMBINED EMERGENCY AND THROTTLE VALVE.
APPLICATION FILED APR. 16, 1909.
1,017,619.
Patented Feb. 13, 1912.
3 SHEETS—SHEET 2.
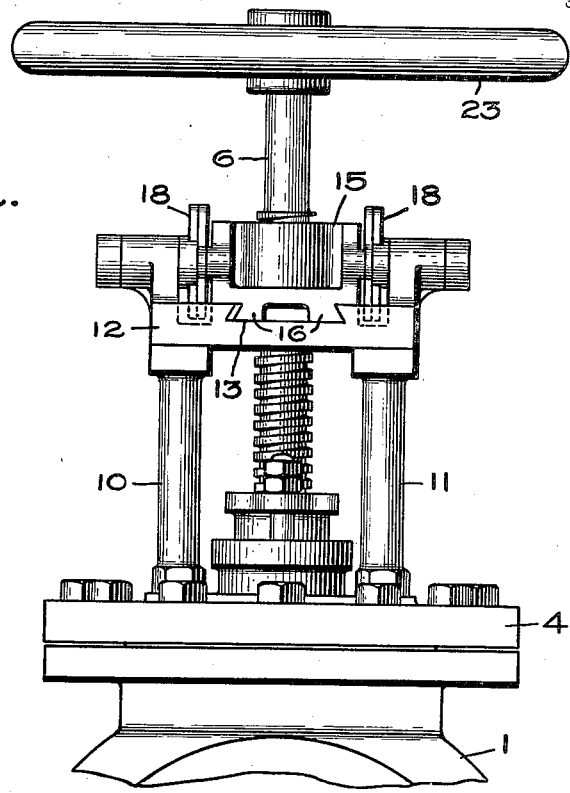
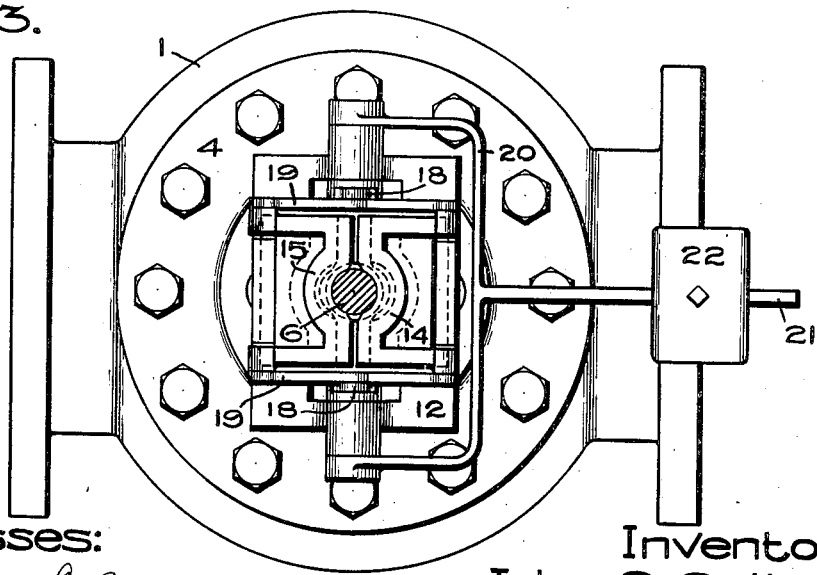
Witnesses:
Inventor,
John G. Callan,
by Atty.

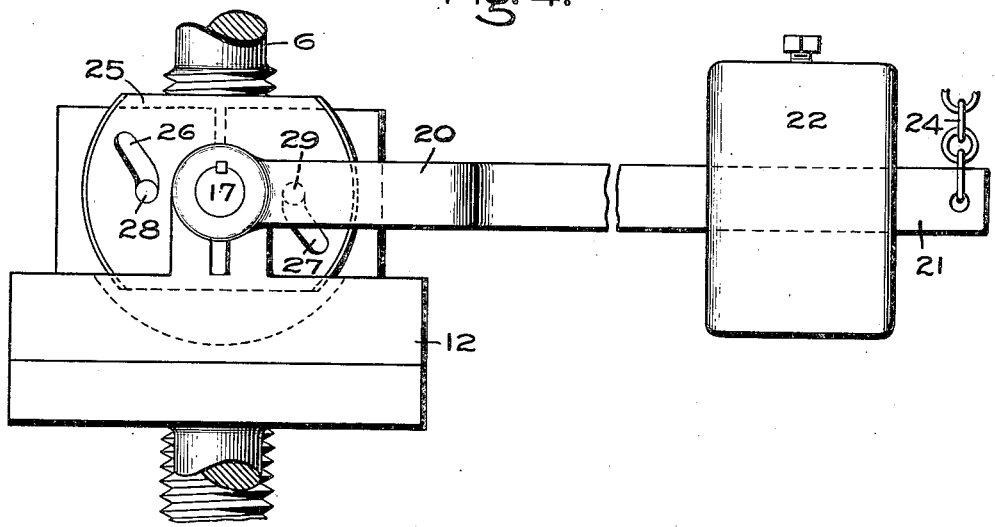
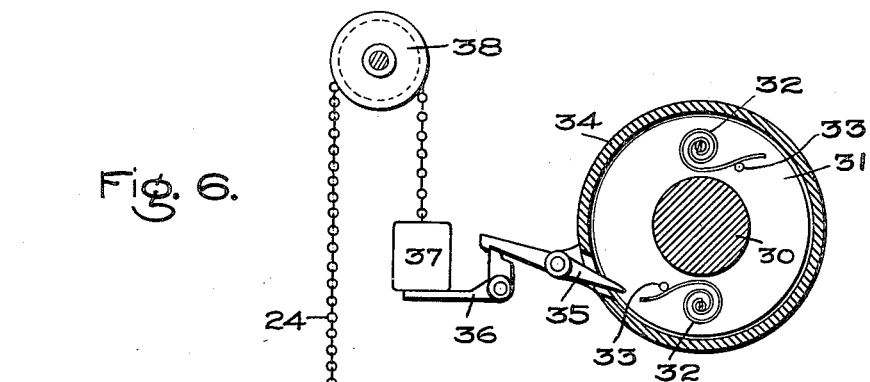
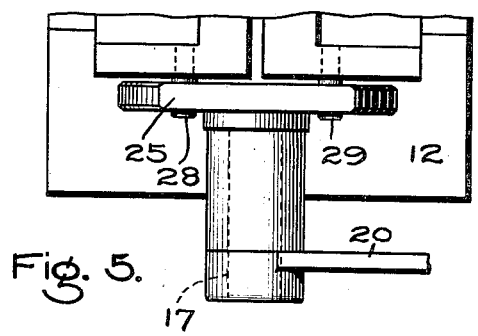

UNITED STATES PATENT OFFICE.

JOHN G. CALLAN, OF NAHANT, MASSACHUSETTS, ASSIGNOR TO GENERAL ELECTRIC COMPANY, A CORPORATION OF NEW YORK.

COMBINED EMERGENCY AND THROTTLE VALVE.

1,017,619.     Specification of Letters Patent.    Patented Feb. 13, 1912.

Application filed April 16, 1909. Serial No. 490,264.

*To all whom it may concern:*

Be it known that I, JOHN G. CALLAN, a citizen of the United States, residing at Nahant, county of Essex, State of Massachusetts, have invented certain new and useful Improvements in Combined Emergency and Throttle Valves, of which the following is a specification.

The present invention relates to valves which are so arranged that they can be opened and closed by hand through a nut and screw, and which can be closed suddenly irrespective of the amount of the opening by an emergency governor.

The object of the present invention is to improve the construction of valves of the character referred to.

For a consideration of what I believe to be novel and my invention, attention is directed to the accompanying description and claims appended thereto.

In the accompanying drawings which are illustrative of certain of the embodiments of my invention, Figure 1 is an axial section of my improved valve; Fig. 2 is a partial view in elevation of the same; Fig. 3 is a plan view of the valve with hand wheel removed; Fig. 4 is a detail view in side elevation of a slight modification; Fig. 5 is a partial plan view of a modification; and Fig. 6 is a detail view showing the emergency governor and means for opening the nut and permitting the valve to close.

1 indicates the casing of the valve which contains a partition 2 and supports the valve seat 3. The top of the casing is provided with a head or bonnet 4 which has a packing 5 for the valve stem 6. The valve is of the unbalanced type and has a constant tendency to close. The valve 7 is secured to the stem in any suitable manner, preferably with a swivel connection to permit the stem to turn. The upper end of the stem where it passes through the bonnet has a cross sectional area which is less than that of the lower portion 8 of the stem. The lower portion extends through the bottom of the casing and steam is prevented from escaping by the packing 9. The lower end of the stem as well as the upper end, is exposed to atmospheric pressure, and hence the tendency for this valve to close when in an open position is equal to the difference in cross sectional area of the upper and lower parts of the stem times the pressure of the fluid. Mounted on top of the head or bonnet 4 are two upright posts 10 and 11 which support the horizontal platform 12. This platform is provided with an opening concentric with but larger than the screw threaded portion of the valve stem 6. It is also provided with a dovetailed groove 13 to receive the right and left hand parts 14 and 15 of the nut. On the under side of the parts of the nut are dovetailed projections 16. The parts of the nut have square screw threads to receive those on the valve stem, and are normally held in engagement therewith. A convenient means for this purpose will now be described: Mounted in bearings formed on the platform 12 are two short pieces of shaft 17. On each of these shafts is mounted an arm 18 and extending above and below the axis thereof. The ends of the arms are connected to the parts of the nut by links 19. Mounted on the shafts 17 is a clevis 20 and extending therefrom is an arm 21 upon which the weight 22 is adjustably mounted. When the weight is in this position, it serves at all times to lock or hold the parts of the nut in engagement with the screw threaded portion of the valve stem. Under these conditions the valve can be opened and closed by the hand wheel 23, the same as any other nut and screw valve. When it is desired to close the valve suddenly, the weight 22 is elevated, as for example by pulling the chain 24. This causes the shafts 17 to turn and with them the links 19 which separate or unlock the parts of the nut and when the threads are moved out of engagement with those on the stem the valve will close, due to the fact that it is unbalanced.

In Figs. 4 and 5 is shown a slight modification of my invention wherein 17 indicates the short pieces of shaft mounted in the bearings carried by the platform 12. The ends of the shafts 17 are united by a clevis 20 as before, and the weight 22 or its equivalent is mounted in such manner as to hold the parts of the nut in engagement with the valve stem. Mounted on the shafts 17 is a cam 25 that is provided with two cam slots 26 and 27. Located in the former slot is a pin 28 and in the latter a pin 29. These pins are respectively attached to the parts of the nut. With the parts arranged as shown, the weight 22 keeps the pins 28 and 29 in the ends of the slots 26 and 27, and the cams hold the parts of the nut in engagement with the screw threads on the valve stem. This arrangement forms a lock because the threads on the stem are incapable of forcing the sections apart. This is made necessary by the fact that V-shaped threads are used. If now the lever 21 is raised, the turning of the cams 23 with the shafts 17 will cause the pins 28 and 29 to be forced outward away from the center, and in so doing, move the right and left hand parts of the nut. Just as soon as the parts of the nut are free from the threads on the valve stems, the valve will close suddenly due to the fact that it is unbalanced. In this embodiment of my invention, as in the one first described, the parts of the nut move in a dovetail groove and are connected to the operating means on opposite sides so that there is no tendency for the parts to twist and stick in the guideway. The length of the guide and the bearing surfaces are so proportioned that the stresses thereon and the effects of wear are reduced to a minimum.

In Fig. 6 is shown a means for actuating the parts of the nut under the control of a speed governor. 30 indicates the shaft of the engine to be controlled and which may be the main shaft or a secondary shaft. The engine may be of the reciprocating type or a turbine, or other apparatus, as desired. Mounted on the shaft is a disk 31 that carries one or more clock springs 32 which are held from unwinding by pins 33. These springs are so arranged that when the speed of the shaft increases above a certain predetermined amount, the outer or free end will move outwardly from the shaft axis a sufficient distance to actuate the valve releasing mechanism. Surrounding the governor springs is a stationary casing 34 which supports a lever 35. One end of the lever projects inside of the casing and is arranged to be struck by the free ends of the springs when the speed becomes excessive and it is desired to close the valve admitting steam to the engine suddenly. The outer end of the lever is provided with a hook that engages the bell crank lever 36, the latter supporting the weight 37. This weight is connected by the chain 24 with the arm 21 which controls the action of the weight. The chain may run over a pulley 38 in order to impart the proper direction of motion, or it may be arranged in any other suitable manner.

For normal operation the valve is opened and closed by the hand wheel nut and screw but after an emergency operation, brought about by the speed governor, it is necessary to reset the parts. This is accomplished in the following manner: The weight 37 is raised by hand or by power and the bell-crank lever 36 hooked under the latch or hook on the lever 35. This permits the weight 22 or its equivalent to force the lever 21 downward and move the parts of the nut together. If the threads of the screw and nut do not exactly match when this happens, no harm is done as the threads will mesh just as soon as the hand wheel is turned slightly, after which the valve may be opened and closed as before. It is to be noted that the weight 22 or its equivalent acts with a constant force to move the parts of the nut into operative position under the conditions specified.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In combination, a valve, a screw threaded stem for normally opening and closing the valve, a nut normally in engagement with the threads on the stem, a means for disengaging the nut and the threads on said stem under emergency conditions, and means for closing the valve quickly when said disengagement occurs.

2. In combination, a valve, a screw threaded stem for normally opening and closing the valve, a divided nut that is normally in engagement with the threads on the stem, a means for moving the parts of the nut away from the stem when it is desired to close the valve suddenly, and a means for closing the valve when the nut and stem are disengaged.

3. In combination, a valve, a screw-threaded stem for the valve, a nut which normally engage the threaded portion of the stem, guides for directing the movements of the nut toward and away from the stem, a means for moving the nut on the guides, and a means for causing the valve to close when the nut and stem are disengaged.

4. In combination, a valve, a screw threaded stem, a nut, the stem and nut coöperating for normal operation, a device responsive to an emergency condition for releasing the stem from the nut, and a means that tends at all times to close the valve.

5. In combination, a valve, a screw threaded stem and hand wheel, a divided nut that coöperates with the stem for normal operation, a lock for holding the parts of the nut in engagement with the stem, a device which unlocks the nut and opens the parts to free the stem, and a means for closing the valve after the nut is opened by said device.

6. In combination, a valve, a screw threaded stem and hand wheel, a divided nut that coöperates with the stem for normal operaation, a means for normally holding the parts of the nut in engagement with the threads on the stem, a means for simultaneously moving the parts of the nut toward and away from the stem, and an emergency mechanism which actuates the said means.

7. In combination, a valve, a screw threaded stem and hand wheel, a divided nut that coöperates with the threads on the stem for normal operation, means for moving the nut including a weighted lever, and a speed responsive device for releasing the weight and permitting it to separate the parts of the nut and free the stem.

8. In combination, a valve, a screw threaded stem and hand wheel, a divided nut that coöperates with the threads on the stem for normal operation, guides for the parts of the nut, a means for opening and closing the parts of the nut, and an emergency governor for controlling the operation of said means.

9. In combination, a valve, a screw threaded stem and hand wheel, a divided nut that coöperates with the threads on the stem for normal operation, a means for normally locking the parts of the nut and for positively opening it when actuated, a speed governor, and a motor that is released by the governor for actuating said means in a manner to open the nut.

10. In combination, a valve, a casing therefor, a screw threaded stem and hand wheel for normally operating the valve, a platform mounted on the valve casing, a divided nut carried by the platform which normally coöperates with the threads on the valve stem, a means for normally holding the parts of the nut in engagement with the threaded stem, a means for moving the parts of the nut in a direction to release the valve stem, and a means for closing the valve when the nut is opened.

11. In combination, a valve which has a tendency to close, a screw threaded stem for the valve, a hand wheel for rotating the stem to normally open and close the valve, a casing for the valve, a divided nut which engages the thread on the stem and the parts of which are mounted for sliding movement on the casing to and from the stem, means for moving the parts of the nut comprising a weighted lever which tends at all times to hold the parts of the nut against the stem, a pivot mounted on the casing adjacent the nut to which one end of the lever is secured, a device mounted on the pivot to rotate therewith, and connections between said device and the parts of the nut, and means for moving the lever in opposition to its weight to withdraw the parts of the nut from engagement with the thread on the stem and thereby permit the valve to close quickly under certain conditions.

In witness whereof, I have hereunto set my hand this 13th day of April, 1909.

JOHN G. CALLAN.

Witnesses:
DUGALD McK. McKILLOP,
CHARLES A. BARNARD.